US006442242B1

(12) United States Patent
McAllister et al.

(10) Patent No.: US 6,442,242 B1
(45) Date of Patent: Aug. 27, 2002

(54) MULTIFUNCTION AUTOATTENDANT SYSTEM AND METHOD OF OPERATION THEREOF

(75) Inventors: Alexander I. McAllister, Silver Spring; Rita Yadav, Ellicott City, both of MD (US)

(73) Assignee: Verizon Services Corporation, New York, NY (US)

( * ) Notice: Subject to any disclaimer, the term of this patent is extended or adjusted under 35 U.S.C. 154(b) by 0 days.

(21) Appl. No.: 09/344,340

(22) Filed: Jun. 25, 1999

(51) Int. Cl.[7] .................. H04M 1/64; H04M 11/00; H04M 3/42; H04M 3/00
(52) U.S. Cl. .............. 379/67.1; 379/93.12; 379/142.13; 379/142.15; 379/201.03; 379/221.02; 379/265.01; 379/265.09; 379/265.12; 379/266.04; 379/266.07; 379/88.13; 379/900
(58) Field of Search .......................... 379/67.1, 70, 76, 379/82, 88.01, 88.03, 88.08, 88.17, 88.18, 88.19, 91.01, 93.12, 114.12, 114.13, 142.15, 201.02, 201.03, 221.02, 265.01–265.09, 265.12, 88.13, 900, 907, 908

(56) References Cited

U.S. PATENT DOCUMENTS

| | | | | |
|---|---|---|---|---|
| 4,837,798 A | | 6/1989 | Cohen et al. | 379/88.14 |
| 5,003,577 A | | 3/1991 | Ertz et al. | 379/88.13 |
| 5,333,266 A | | 7/1994 | Boaz et al. | 709/206 |
| 5,402,499 A | | 3/1995 | Robison et al. | 381/119 |
| 5,524,137 A | | 6/1996 | Rhee | 379/88.01 |
| 5,530,740 A | | 6/1996 | Irribarren et al. | 379/88.17 |
| 5,555,299 A | * | 9/1996 | Maloney | 379/212 |
| 5,557,659 A | | 9/1996 | Hyde-Thompson | 379/88.13 |
| 5,608,786 A | | 3/1997 | Gordon | 370/352 |
| 5,719,921 A | * | 2/1998 | Vysotsky et al. | 379/88.01 |
| 5,742,668 A | * | 4/1998 | Pepe et al. | 379/58 |
| 5,884,032 A | * | 3/1999 | Bateman et al. | 395/200.34 |
| 5,946,386 A | * | 8/1999 | Rogers et al. | 379/265 |
| 5,974,135 A | * | 10/1999 | Breneman et al. | 379/265 |
| 6,009,469 A | * | 12/1999 | Mattaway et al. | 709/227 |
| 6,035,104 A | * | 3/2000 | Zahariev | 395/200.33 |
| 6,046,762 A | * | 4/2000 | Sonesh et al. | 348/16 |
| 6,233,318 B1 | * | 5/2001 | Picard et al. | 379/88.17 |

\* cited by examiner

*Primary Examiner*—Allan Hoosain
(74) *Attorney, Agent, or Firm*—Fulbright & Jaworski, LLP

(57) ABSTRACT

A call processing apparatus incorporates a robust database supporting both autodialing and autoattendant functions. Incoming calls not directed to a specific telephone extension and any call to a dedicated autodialer function are answered and the caller prompted to speak the name of the desired person or department. A speech recognition platform analyzes the spoken name to provide one or more searchable text strings representing the various spellings associated with the spoken name. The database is searched to retrieve corresponding terminal address instructions such as the telephone number or extension of the named party and call routing to the address is initiated. Alternatively, in an autoattendant mode, a subscriber calls a telephone number associated with a specified service such as a hotline and is asked to identify himself by name. The speech recognition platform again provides a corresponding searchable text string used to retrieve subscriber-specific information for handling the call. Based on the retrieved information, the caller is prompted to give any additional information required to process the call and compose and send an e-mail message to an appropriate person or department. Requests or messages not having an appropriate prestored or formatted text message equivalent may instead be sent as voice message files attached to an e-mail message.

18 Claims, 4 Drawing Sheets

MULTIFUNCTION AUTOATTENDANT SYSTEM AND METHOD OF OPERATION THEREOF

BACKGROUND OF THE INVENTION

1. Field of the Invention

The invention relates to telephone autoattendant systems and methods of operation thereof and more particularly to autoattendant systems providing both voice dialing and digital messaging using a common subscriber database.

2. Description of the Related Technology

Telephone systems have long taken advantage of the enhanced capabilities provided by advances in computer systems and microprocessor design. Using technologies including voice recognition, distributed processing, database management systems, etc., many tasks previously handled on a manual basis have been automated. Thus, it has become commonplace for businesses to replace or augment human telephone operators with an autoattendant system for greeting and initial handling of incoming telephone calls.

Autoattendant systems are commonly based around interactive voice response (IVR) systems which can be programmed to answer incoming calls and elicit information from the calling party. Based on the caller's response, the call may be routed to a desired extension, or the system may automatically handle the request by, for example, playing informational recordings to the caller and/or allowing the caller to leave a message such as a catalog request. In some cases, an IVR includes limited voice recognition capabilities to allow the caller to interact with the IVR by speaking selections and requests rather than requiring the use of a DTMF telephone keypad.

To route incoming calls, autoattendant systems may include a directory function so that a caller can be connected to a called party by name when the party's extension is not known. Conventional systems may require the caller to input the name of the desired called party using the DTMF keypad of their telephone. More recently, with the commercial availability of speaker-independent speech recognition engines and platforms, autoattendants have included the capability to route calls based on the spoken name of the called party. Using such a system, a speech recognition engine translates the speech signal of a calling party into corresponding search criteria, usually the phonetic or corresponding spellings for a particular name to access an electronic telephone directory. If the name of the called party as interpreted by the speech recognition engine can be found in the directory, the corresponding telephone number or extension is retrieved and the call is extended or forwarded based on that information.

Autoattendant systems are also sometimes used to provide information to or take requests from a calling party. For example, an autoattendant system may be programmed to give the calling party the option of receiving additional information, such as by listening to prerecorded announcements or by having information sent to them by mail. Thus, a caller may be prompted to select from a listing of informational audio segments to hear a recording addressing common customer inquiries such as store hours and locations of retail establishments, show times for selected movies at a cinema, tax filing information from the IRS, etc. Such functionality may be augmented by a voice mail platform so that the caller can provide any required information to receive additional assistance or information. For example, the autoattendant may prompt the caller to leave his or her name and address to receive a catalog or forms or may provide for after-hours ordering of goods and services from a retail establishment.

While autoattendant functionalities and capabilities have been enhanced with advances in technology, little advancement has been made in integrating a broad spectrum of functions to address in-house corporate requirements while still accommodating customer needs. Thus, while companies may establish autoattendant functions in support of staff requirements, such functions do not utilize full autoattendant capabilities. For example, a corporate telephone system may include a dedicated "bad weather" telephone number which can be accessed by employees to find out about closures and alternative work arrangements applicable to a particular weather event. However, such functions provide no more than that available to other outside callers: prerecorded announcements.

Accordingly, a need exists for an enhanced telephone call center that provides a broad spectrum of capabilities and functionalities to address external and internal corporate needs.

A further need exists for an autoattendant system that intelligently handles both call routing and service request functions.

A still further need exists for an interactive voice response unit that provides for multiple forms of messaging.

SUMMARY OF THE INVENTION

A call processing system according to the invention includes a database of subscriber information including a telephone directory for routing calls to a subscriber and subscriber-specific information for handling subscriber requests. In addition to automated directory and call forwarding functions, the system uses a speech recognition engine to handle subscriber-specific requirements. An integrated messaging capability provides for the transmission of preformatted messages forwarding a subscriber's request while special requirements are handled by the attachment of voice files to e-mails for transmission to and handling by the appropriate person or organization.

According to one aspect of the invention, a call processing system for servicing voice calls placed on a telephone network include a voice processor for processing a speech signal received on the telephone network from a caller. A subscriber database stores subscriber-specific information which is retrieved in response to the processing of the speech signal by the voice processor. A telephone switch initiates completion of a voice call from the caller to a voice telephone terminal specified by the subscriber-specific information. In response to a selection made by the caller requesting a product related service, a communications processor selectively generates a digital message, which is then transmitted by a data network to a provider of the product related service at a remote digital terminal specified by the subscriber-specific information.

According to a feature of the invention, an interactive voice response unit is configured to provide the caller with subscriber-specific information, e.g., name, telephone number, contact information, etc. The subscriber database may include a telephone directory associating names with respective telephone number data, the subscriber-specific information including the telephone number data.

According to another feature of the invention, the digital message comprises an electronic mail (e-mail) message. The e-mail may be transmitted using simple mail transfer protocol (SMTP) and may include an attached, playable audio file.

According to another feature of the invention, the voice processor includes a speaker-independent voice recognition engine.

According to another feature of the invention, the subscriber-specific information includes name, telephone number, and service information for each of the subscribers. The service information may include e-mail address information of the respective subscribers or of other parties to whom messages may be sent. The messages may be pre-stored or preformatted text or other message types. Portions or the entirety of these messages may also be stored as subscriber-specific information.

According to another aspect of the invention, a call processing system includes a telephone interface configured to receive a telephone call from a voice telephone network and to provide an indication of a dialed telephone number associated with the telephone call. A controller is responsive to the indication for selectively handling the telephone call in either a directory or messaging mode of operation. A voice processor is configured to process a speech signal of the telephone call received from a calling party. A subscriber database stores a plurality of records of respective subscriber information while a subscriber database management system retrieves data from one of the records of subscriber information in response to a processing of the speech signal by the voice processor. A switch is operable in the telephone directory mode of operation to selectively initiate completion of the telephone call to a telephone terminal specified by the subscriber information. Alternatively, in the messaging mode of operation, a voice response unit is responsive to the subscriber information to provide a prompt soliciting information from the caller requesting a product related service. A messaging system is also operable in the messaging mode of operation and, in response to information received from the caller in response to the prompt, generates a digital message including an indication of the service, e.g., reflecting and/or incorporating the information provided by the caller. This information can then be transmitted in the form of a digital message over a data network to a digital terminal.

According to a feature of the invention, an address of the digital terminal is retrieved in response to the indication of the dialed telephone number.

According to another feature of the invention, the subscriber information includes subscriber name and telephone number data and messages which may be in the form of message text. The digital message may include identification of the calling party formatted and/or transmitted as an electronic mail (e-mail) message using, for example, simple mail transfer protocol (SMTP) and may include the pre-stored message text. According to another feature of the invention, an audio file may be transmitted by the messaging system as an attachment to the e-mail message.

According to another aspect of the invention, a method of processing voice calls placed on a telephone network includes the steps of processing a speech signal received on the telephone network from a caller and retrieving subscriber-specific information in response to processing of the speech signal. A step is performed of selectively (i) completing a voice message from the caller to a telephone line or terminal specified by the subscriber information or (ii) generating a digital message requesting a product related service in response to a selection made by the caller. The digital message is then transmitted to a digital terminal specified by the subscriber-specific information.

According to another aspect of the invention, a call processing method includes the steps of receiving a telephone call from a telephone network and providing an indication of a dialed telephone number associated with the incoming telephone call. The telephone call is then selectively handled in either a directory or messaging mode of operation. A speech signal of the telephone call received from the caller is processed and, in response, data is retrieved from a record of subscriber information stored in, for example, a database. In the directory mode, completion of a telephone call is selectively initiated to a telephone terminal specified by the subscriber information. Alternatively, in the messaging mode of operation, the caller is prompted to provide information and, in response, a digital message requesting a product related service is generated reflecting or incorporating the information and is then transmitted to a digital terminal.

These, together with other objects and advantages which will be subsequently apparent, reside in the details of construction and operation as more fully hereinafter described in the claims, with reference being had to the accompanying drawings forming a part thereof, wherein like numerals refer to like elements throughout.

DETAILED DESCRIPTION OF THE PREFERRED EMBODIMENT

Figure 1:
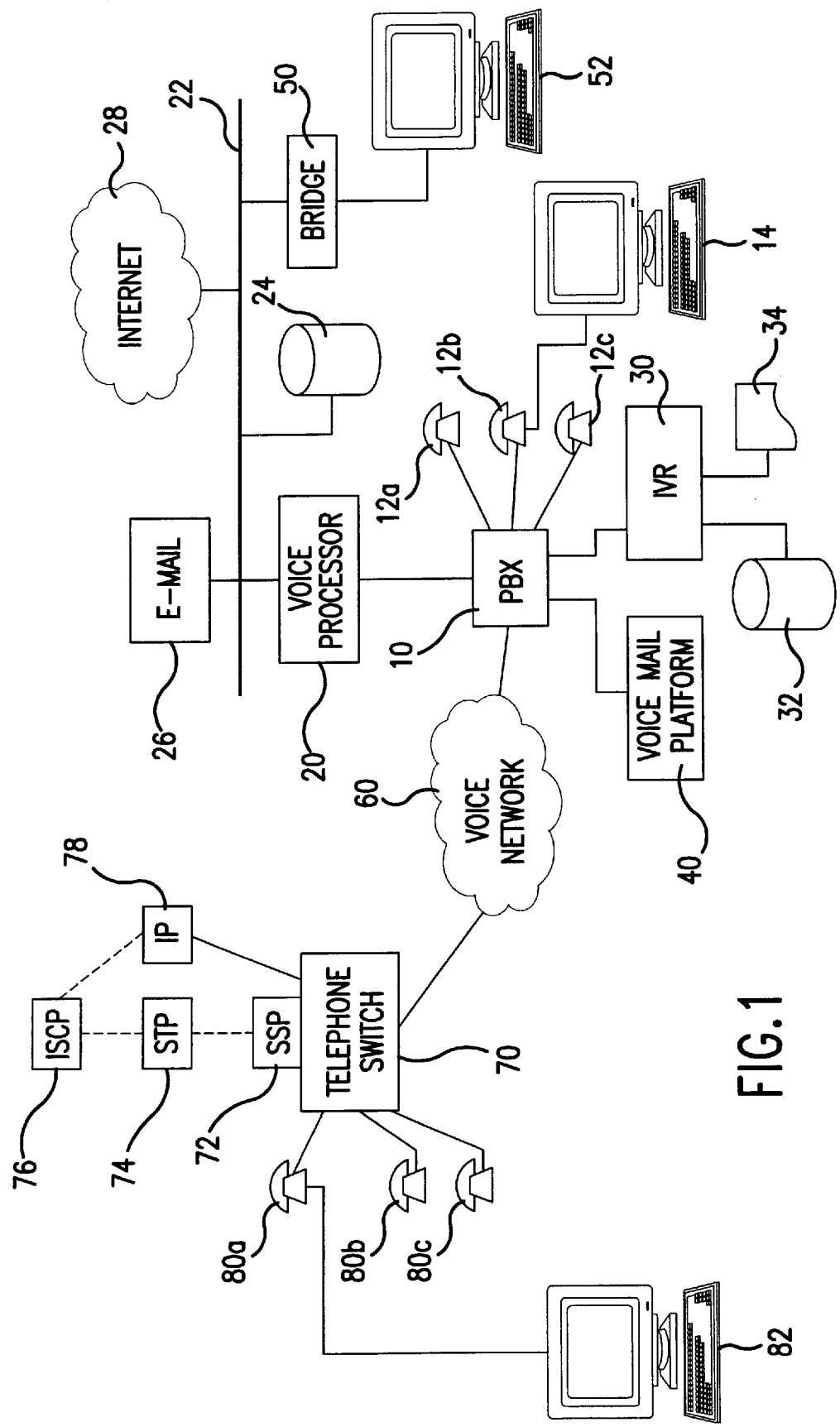
FIG. 1 is a block diagram of a call processing system according to the invention.

According to an embodiment of the invention shown in FIG. 1, a private automatic branch exchange (PBX) 10 is located at a customer facility in the form of customer premises equipment (CPE). Alternatively, this functionality may be provided by telephone company (telco) central office (CO) equipment such as CENTREX service or may be provided to subscribers on a subscription basis and incorporated into an intelligent peripheral (IP) of an advanced intelligent network (AIN). PBX 10, in turn, provides service to a plurality of subscriber voice telephone stations 12a–12c and, for example, to an appropriately interfaced data terminal 14. Data terminal 14 may be a dedicated teletype device used by hearing impaired subscribers or may be a general purpose personal computer running appropriate communications software. PBX 10 further connects to voice telephone network 60, voice processor 20, interactive voice response (IVR) platform 30, and voice mail platform 40. Voice processor 20 is also connected to a common bus 22 to which is connected to a database 24, e-mail system 26, and a wide area data network such as the Internet 28. Also connected to bus 22 is a bridge 50 for connecting terminal 52 to the various resources provided on bus 22.

IVR 30 includes facilities for providing voice prompts to a caller and includes its own database 32 and printer 34.

Thus, IVR 30 is operable in a stand-alone configuration to handle incoming telephone calls or may be interfaced with other system components to jointly service and handle incoming telephone calls.

Referring to the left side of FIG. 1, a telephone switch 70, also connected to voice telephone network 60, provides switching to originate telephone calls from voice telephone stations 80a–80c and from properly interfaced digital devices such as data terminal or teletype 82 connected at a subscriber location. Telephone switch 70 is also connected to a supervisory control network for providing network control messaging between and among telephone switching systems, providing additional data processing functionality, and coordinating voice network operations. This network may use signaling system 7 (SS7) to communicate between and among the switches and other components of the network and may itself constitute an advanced intelligent network (AIN) for implementing advanced services. Thus, telephone switch 70 includes a service switching point (SSP) 72 in communication with a regional signal transfer point (STP) 74 or mated STP pair (not shown). The AIN may also include an integrated service control point (ISCP) 76 and a network-based intelligent peripheral (IP) 78 providing additional subscriber features and functions. For example, IP 78 may include and provide voice recognition capabilities, messaging services, database access, etc. Thus, although the functionality provided by the subject embodiment of the invention is implemented using dedicated components at the customer premises, this functionality may also or alternatively be included as a network feature and supported by network equipment including IP 78.

In operation, a caller may use voice telephone stations 80a–80c to initiate a call, through telephone switch 70 in voice network 60, to a facility-based PBX 10. TTY equipment 82 may be used to transmit and receive text instead of voice messages such as for a hearing impaired user. A caller would initiate a call by dialing the appropriate telephone number, which information would be passed along to PBX 10. In response to the incoming call being received by PBX 10 on an appropriate trunk, PBX 10 would route the call based on the dialed telephone number information to the appropriate (i) subscriber station 12a, 12b or 12c, (ii) voice processor 20, (iii) WVR 30 or (iv) voice mail platform 40 for termination. For example, if the caller knew the direct inward dial (DID) telephone number of a desired party and, accordingly, dialed that number, this information would be passed to PBX 10 for routing of the telephone call to the appropriate subscriber station 12a–12c. Alternatively, if the caller desired an alternative service or dialed a main telephone number, PBX 10 would direct the telephone call to the appropriate service platform. For example, calls made to the main telephone number may be routed to voice processor 20 which is then operated in an automated directory mode of operation. In such a mode, voice processor 20 would play one or more prompts directing the caller to say or speak the name of the party being called. In response to receiving a spoken name, voice processor 20 accesses subscriber database 24 storing a telephone listing of the names and extensions of subscribers serviced by PBX 10. Upon identification of the named party's telephone number, dialing information is forwarded to PBX 10 for completion of the call to the appropriate subscriber station 12a–12c. Although routing of incoming calls received from remote stations by PBX 10 in combination with voice processor 20 for terminating incoming calls is usually considered to be an "autoattendant capability," it provides an "autodialer capability" when initiated by local subscribers 12a–12c for initiating telephone calls. The extension of database 24 to cover outside listings would further enable voice dialing of calls beyond PBX 10 to remote telephone stations.

Similarly, calls made to dedicated special service telephone numbers may be routed to IVR 30 for handling. For example, customers of a company may be provided with a company sales telephone number to call for automated entry of service or product orders, i.e., some product related service. In this mode of operation, IVR 30 may be supplied with caller identification information by automatic number identification (ANI) or caller ID signaling or by the caller manually supplying identification information. In response to identification of the caller, IVR 30 may access database 32 to retrieve appropriate calling party information for proper call handling. Likewise, information supplied by the caller such as designation of items or services being ordered during the telephone call, may be stored in database 32 and/or printed by printer 34.

Also supported by and accessible via PBX 10 is voice mail platform 40. This platform supplies conventional voice messaging functions and may be configured to support IVR 30 and voice processor 20 to record, store and forward voice messages to platform users.

In addition to providing conventional telephone directory information, database 24 includes additional subscriber information for processing and handling subscriber-initiated requests. Calls are routed to PBX 10 based on the telephone number or extension dialed (e.g., a hotline, trouble reporting or service line telephone number or other product related service). Typically, the caller would be prompted by voice processor 20 to speak his or her name so that appropriate subscriber-specific information can be retrieved from database 24. This information, for example, may include an indication of the type of equipment used by the subscriber as appropriate to the particular product related service being requested. Voice processor 20 uses this subscriber-specific information to provide caller appropriate prompts, eliciting information to complete a request. Generalized or commonly occurring requests may result in selection and transmission of a corresponding standard, prestored text or voice message. The message may be generated by voice processor 20 or e-mail system 26 or may be stored as subscriber specific information. Alternatively, requests not associable with a suitable prestored or preformatted message may be handled by forwarding a short voice message as an audio file attached to an e-mail transmission. Where voice processor 10 has a robust speech-to-text capability, a voice message may be converted to text and sent as e-mail directly. Whether the request is formatted as an e-mail message or as an attachment to an email message, it is formatted by e-mail platform 26 for subsequent transmission to a remote terminal via Internet 28 or local terminal 52 via bridge 50.

Figure 2:
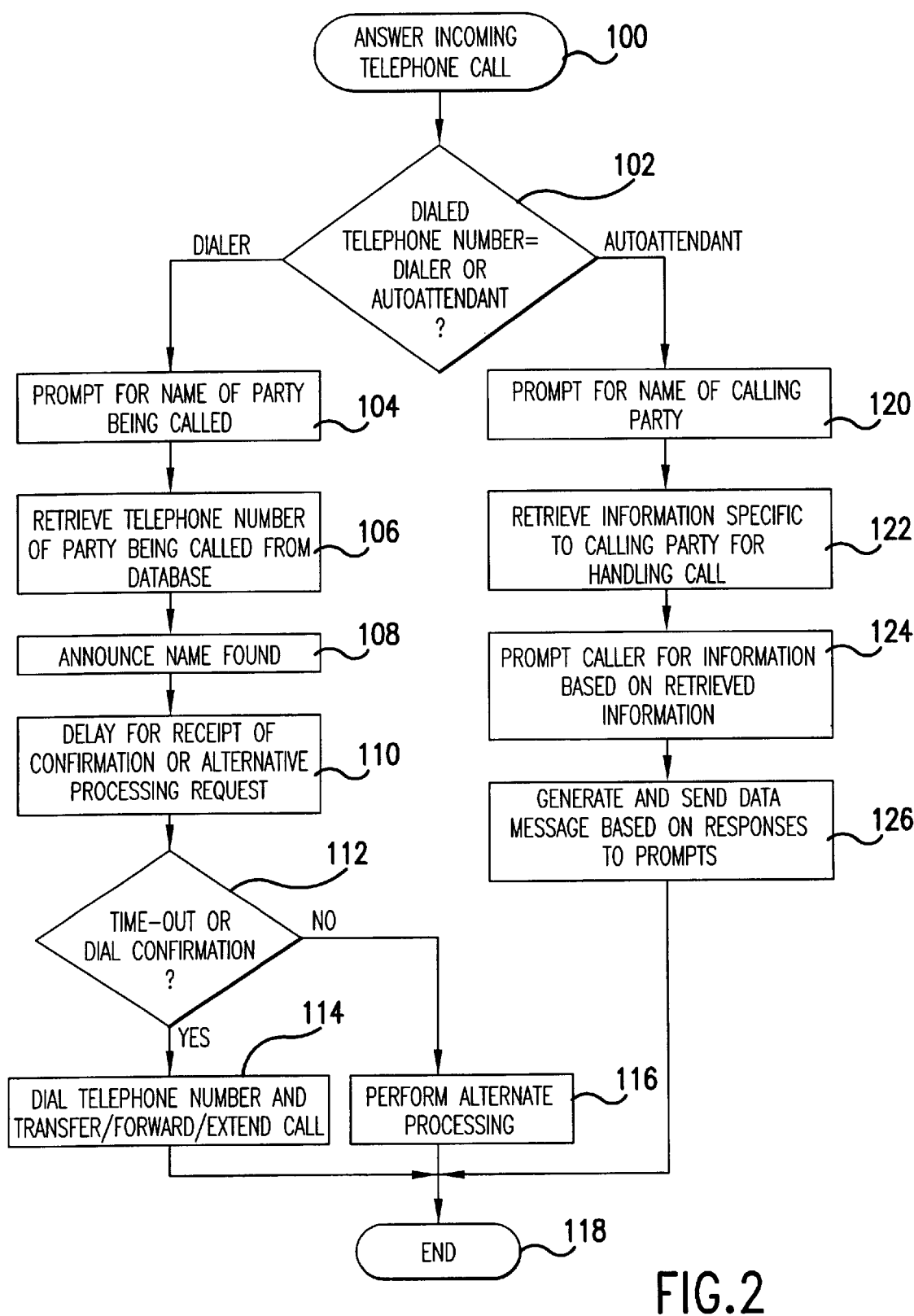
FIG. 2 is a logic flow diagram for a method of answering an incoming telephone call to provide either an autodialer/directory or autoattendant/messaging functionality as appropriate.

A flow process for handling an incoming call is depicted in FIG. 2. Initially, at step 100, an incoming call is answered by the system. Based on the called telephone number, a determination is made whether the call should be routed to an autodialer or an autoattendant function at decision step 102. If the dialed telephone number indicates that the caller should be routed to an autodialer for completion of an outgoing telephone call or for routing to an appropriate extension service by a PBX, then processing continues out the left portion to continue at step 104. For example, outside calls to a company's main telephone number may be routed to the dialer for call completion after normal business hours while internal calls placed to a corporate dialer would receive similar handling to provide voice dialing functionality.

At step 104, the caller is prompted to provide the name of a party being called. The spoken name of the caller is analyzed and converted to a corresponding text stream which may include the spoken phonemes and/or the various spellings associated with the spoken name. In either case, a telephone directory is searched to identify a telephone number associated with the spoken name and, at step 108, an appropriate announcement is made to the caller indicating that the name has been found. A brief delay is introduced at step 110 to accommodate alternative processing and to allow the caller to abort automatic dialing of the telephone number. After this predetermined delay, as determined at step 112, or upon receiving an indication that the person named should be dialed, dialing is performed at step 114 and the call is completed. Alternatively, upon an indication of alternative processing, processing continues at step 116 to provide the requested processing.

In response to dialing of a telephone number corresponding to an autoattendant function, processing continues out the right side of step 102 to step 120 where the caller is prompted to say his or her name so that processing appropriate to the specific requirements may be initiated. Subscriber-specific information is retrieved at step 112 to initiate such subscriber-specific processing. Once the appropriate subscriber-specific information is retrieved, the caller is prompted to provide information for forwarding to appropriate personnel. Identification of such appropriate personnel may be included as part of subscriber-specific information or may be otherwise known or obtained by the system. At step 126, an appropriate message is formatted and generated, either as an e-mail and/or as an attachment to an e-mail for transmission to appropriate personnel or systems.

Figure 3:
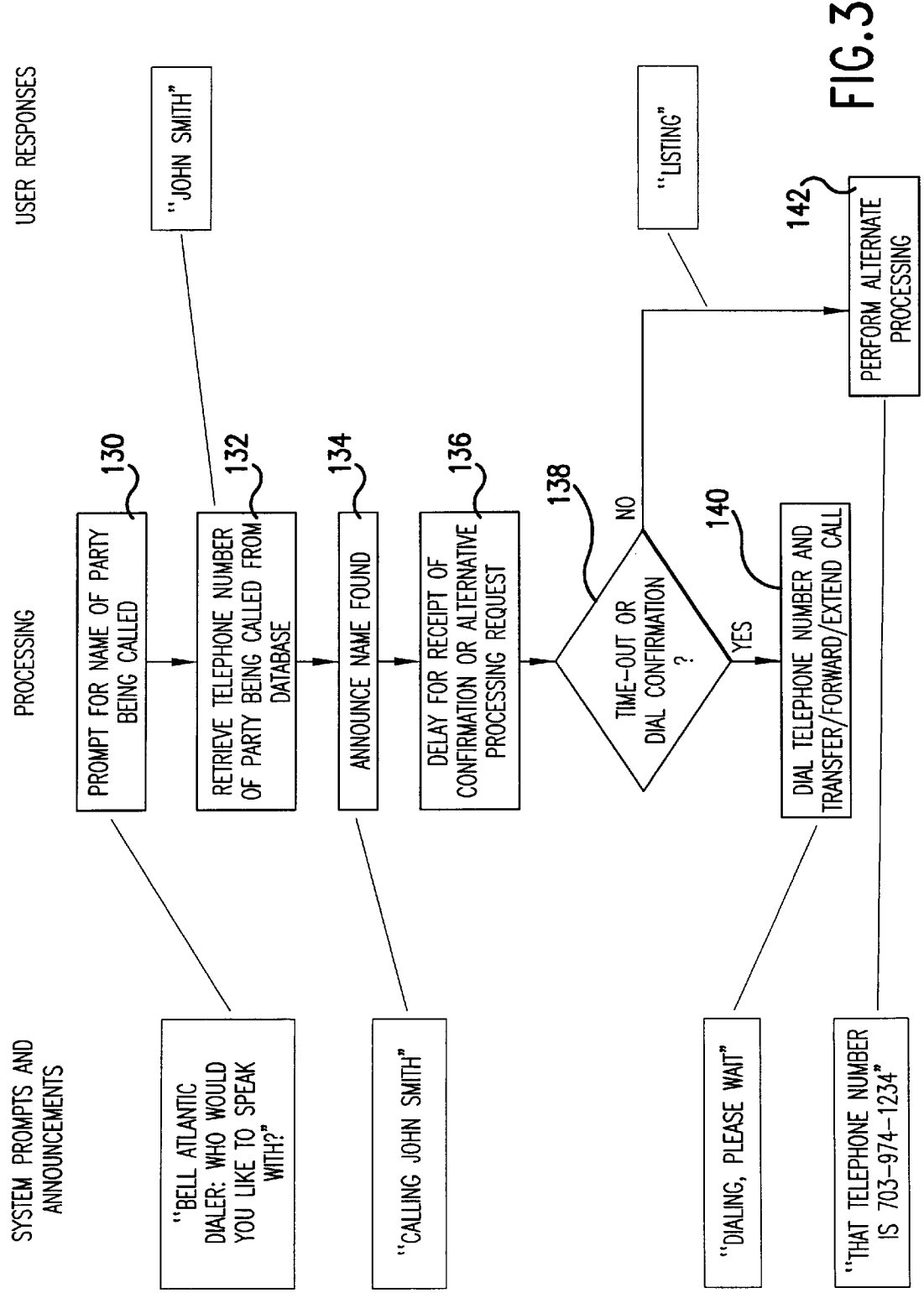
FIG. 3 is a flow diagram including sample system prompts and user responses provided by and handled by a call processing system and method according to the invention operating in an autodialer/directory mode of operation.

Processing when operating in the autodialer mode, together with possible system prompts and user responses, is detailed in FIG. 3. At initial step 130, the caller is prompted to speak the name of the party being called, e.g., "Bell Atlantic Dialer: who would you like to speak with?" In response, the caller replies "John Smith." The system processes the speech, identifies the appropriate listing for John Smith, and retrieves the corresponding telephone number from the database 24. The caller is then informed at step 134 that the system is "calling John Smith." A short delay is inserted at step 136 to accommodate processing termination in the case of a misidentification or if the caller requests alternative processing, e.g., requests the "listing" of the called party as per step 142 rather than completion of a call to that person. Thus, in the absence of a timeout or a command to dial the telephone number, processing continues out the right side of decision step 138 to step 142 where the alternative processing is initiated. Alternatively, if the caller does not initiate alternative processing, the system continues at step 140 to announce that the retrieved telephone number is being dialed, and an appropriate processing is initiated to complete the call to that party.

Figure 4:
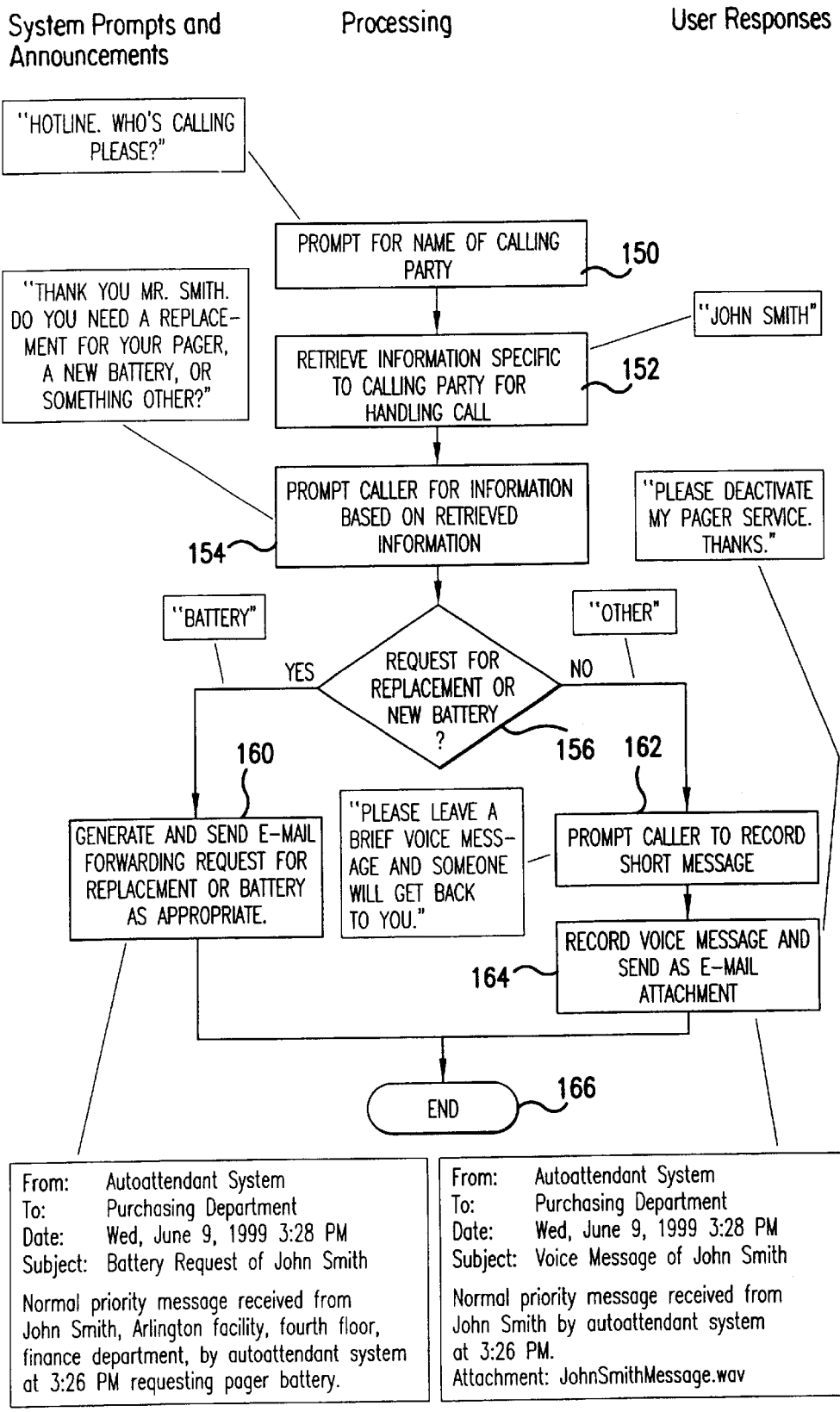
FIG. 4 is a logic flow diagram including system prompts and announces and user responses illustrating operation of a call processing system and method according to the invention operating in an autoattendant/messaging mode of operation.

A method according to a preferred embodiment of the invention for providing autoattendant functionality is depicted with examples in FIG. 4. In response to a caller dialing an appropriate telephone number, a greeting is played at step 150 and the caller is prompted to provide his or her name. In the example, the voice processor announces "Hotline. Who's calling, please?". At step 152, in response to the caller identifying himself as "John Smith," the database 24 is accessed and subscriber-specific information associated with the named individual is retrieved. In the instant example wherein the hotline is established to provide trouble reporting in connection with wireless devices (i.e., a product related service) such as pagers and cellular telephones, the system may determine that the named individual has a pager account which includes supplying batteries as needed. Thus, at step 154 the system formulates and provides an appropriate prompt to the caller, such as "Thank you, Mr. Smith. Do you need a replacement for your pager, a new battery or something other?". The audio message may be synthesized or a prerecorded message which, in turn, may be stored as a playable audio file stored as part of, or as designated by, the corresponding subscriber-specific information.

At decision step 156, the caller's response to the system prompt is received and a determination is made whether an appropriate prestored message is available or if the request must be otherwise handled. Thus, if the caller indicates that a new battery is required, processing continues at step 160 and an appropriate e-mail message is formatted, subscriber-specific information is inserted, and the message is transmitted. In the instant case, a prestored message is generated to the purchasing department requesting a product related service, in this case indicating that John Smith has requested a new battery for his pager. Additional subscriber-specific information pertinent to handling the request is extracted from database 24 and provided, e.g., subscriber location information.

In contrast, should the caller indicate that other processing is required, the system prompts the caller at step 162 to record a short message: "Please leave a brief voice message and someone will get back to you." The caller may then provide a brief voice message which is converted to an appropriate audio file format, such as a WAV or MP3 file, and transmitted as an attachment to an e-mail message. In the instant example, in response to data retrieved from the database and including subscriber-specific information retrieved corresponding to "John Smith," a message is sent to the purchasing department indicating that a message had been received from John Smith by the autoattendant system at 3:26 p.m. and is being forwarded as an attachment to the e-mail.

In addition to or instead of attaching playable audio files, voice processor 20 may include enhanced speech recognition capabilities supporting a natural language speech-to-text conversion capability. In this case, custom messages may be composed, converted to text and transmitted in the body of an e-mail message. To further expedite message processing, e-mail messages may be sent to addresses appropriate to the requested action or may have "subject" fields or "re" lines to automatically initiate processing upon receipt of the message at its destination server or mailbox. For example, messages containing requests for "new batteries" may be sent to a corresponding e-mail address while those for "replacement pagers" are sent to another. Likewise, an e-mail message subject field may indicate the type of request so that appropriate filtering and/or handling rules implemented at and by the recipient's e-mail program can appropriately direct and process the request.

As described, an advantage of the call processing system and method of operating such a system is the use of a common database providing both autoattendant/autodialer capabilities and further supporting subscriber-specific messaging functionalities. Thus, the common database is used to retrieve telephone numbers of called parties to complete calls to the parties and to provide for subscriber-specific message generating and handling, such as provided by a hotline or help line system.

It will be readily seen by one of ordinary skill in the art that the present invention fulfills all of the objects set forth above. After reading the foregoing specification, one of ordinary skill will be able to effect various changes, substitutions of equivalents, and various other aspects of the invention as broadly disclosed herein. It is therefore intended that the protection granted herein be limited only by the definition contained in the appended claims and equivalents thereof.

What is claimed is:

1. A call processing system for servicing voice calls, the call processing system comprising:
   a voice processor configured to process a speech signal from a caller;
   a subscriber database configured to retrieve subscriber-specific information in response to a processing of said speech signal by said voice processor;
   a switch configured to selectively initiate completion of a voice call from the caller to a telephone line specified by said subscriber-specific information;
   a processor configured to selectively generate an e-mail message in response to a selection made by the caller requesting a product related service; and
   a data network configured to selectively transmit said e-mail message to a provider of said product related service at a digital terminal specified by said subscriber-specific information.

2. The call processing system according to claim 1 further comprising an interactive voice response unit configured to provide the caller with said subscriber-specific information.

3. The call processing system according to claim 1 wherein said subscriber database includes a telephone directory associating names with respective telephone number data and said subscriber-specific information includes said telephone number data.

4. The call processing system according to claim 1 wherein said e-mail message is transmitted using Simple Mail Transfer Protocol (SMTP).

5. The call processing system according to claim 1 wherein said voice processor includes a speaker independent voice recognition engine.

6. The call processing system according to claim 1 wherein said subscriber-specific information includes name, telephone number, and service information for each of a plurality of subscribers.

7. The call processing system according to claim 6 wherein said service information includes e-mail address information.

8. The call processing system according to claim 6 wherein said service information includes message text.

9. A call processing system for servicing voice calls, the call processing system comprising:
   a voice processor configured to process a speech signal from a caller;
   a subscriber database configured to retrieve subscriber-specific information in response to a processing of said speech signal by said voice processor;
   a switch configured to selectively initiate completion of a voice call from the caller to a telephone line specified by said subscriber-specific information;
   a processor configured to selectively generate a digital message in response to a selection made by the caller requesting a product related service and transmit an audio file as an attachment to said digital message; and
   a data network configured to selectively transmit said digital message to a provider of said product related service at a digital terminal specified by said subscriber-specific information.

10. A call processing system comprising:
    a telephone interface configured to receive a telephone call from a telephone network and to provide an indication of a dialed telephone number associated with the telephone call;
    a controller responsive to said indication for selectively handling the telephone call in a directory mode of operation and in a messaging mode of operation;
    a voice processor configured to process a speech signal of the telephone call received from a calling party;
    a subscriber database storing a plurality of records of respective subscriber information;
    a subscriber database management system configured to retrieve data from one of said records of subscriber information in response to a processing of said speech signal by said voice processor;
    a switch operable in said directory mode of operation to selectively initiate completion of the telephone call to a telephone terminal specified by said subscriber information;
    a voice response unit operable in said messaging mode of operation and responsive to said subscriber information to provide a prompt soliciting information from the calling party requesting a product related service;
    a messaging system operable in said messaging mode of operation and responsive to data received from the calling party to generate a digital message including an indication of said service and transmit an audio file as an attachment to said digital message; and
    a data network configured to selectively transmit said digital message to a digital terminal.

11. A method of processing voice calls placed on a telephone network comprising the steps of:
    processing a speech signal from a caller received on the telephone network;
    retrieving subscriber-specific information in response to said processing step;
    selectively (i) completing a voice call from the caller to a telephone line specified by said subscriber-specific information and (ii) generating an e-mail message requesting a product related service in response to a selection made by the caller; and
    transmitting said e-mail message to a digital terminal specified by said subscriber-specific information.

12. A call processing method comprising the steps of:
    receiving a telephone call from a telephone network and providing an indication of a dialed telephone number associated with the telephone call;
    selectively handling the telephone call in a directory mode of operation and in a messaging mode of operation;
    processing a speech signal of the telephone call received from a calling party;
    storing a plurality of records of respective subscriber information;
    retrieving data from one of said records of subscriber information in response to said step of processing;
    selectively initiating a completion of the telephone call to a telephone line specified by said subscriber information;
    prompting the calling party, in the messaging mode of operation, to provide information;
    generating an e-mail message requesting a product related service reflecting data received from the calling party in response to said prompting step; and transmitting said e-mail message to a digital terminal.

13. A call processing system comprising:

a telephone interface configured to receive a telephone call from a telephone network and to provide an indication of a dialed telephone number associated with the telephone call;

a controller responsive to said indication for selectively handling the telephone call in a directory mode of operation and in a messaging mode of operation;

a voice processor configured to process a speech signal of the telephone call received from a calling party;

a subscriber database storing a plurality of records of respective subscriber information;

a subscriber database management system configured to retrieve data from one of said records of subscriber information in response to a processing of said speech signal by said voice processor;

a switch operable in said directory mode of operation to selectively initiate completion of the telephone call to a telephone terminal specified by said subscriber information;

a voice response unit operable in said messaging mode of operation and responsive to said subscriber information to provide a prompt soliciting information from the calling party requesting a product related service;

a messaging system operable in said messaging mode of operation and responsive to data received from the calling party to generate an e-mail message including an indication of said service; and a data network configured to selectively transmit said e-mail message to a digital terminal.

14. The call processing system according to claim 13 wherein an address of said digital terminal is retrieved in response to said indication of the dialed telephone number.

15. The call processing system according to claim 13 wherein said subscriber information includes subscriber name and telephone number data.

16. The call processing system according to claim 11 wherein said e-mail message include an identification of the calling party.

17. The call processing system according to claim 13 wherein said e-mail message is transmitted on said data network using Simple Mail Transfer Protocol (SMTP).

18. The call processing system according to claim 13 wherein said voice processor includes a speaker independent voice recognition engine.

* * * * *